(12) United States Patent
Schewitz

(10) Patent No.: US 12,097,449 B2
(45) Date of Patent: Sep. 24, 2024

(54) MODULAR FILTER ELEMENT FRAME

(71) Applicant: Larry Schewitz, East London (ZA)

(72) Inventor: Larry Schewitz, East London (ZA)

( * ) Notice: Subject to any disclaimer, the term of this patent is extended or adjusted under 35 U.S.C. 154(b) by 486 days.

(21) Appl. No.: 17/424,767

(22) PCT Filed: Dec. 6, 2019

(86) PCT No.: PCT/IB2019/060509
§ 371 (c)(1),
(2) Date: Jul. 21, 2021

(87) PCT Pub. No.: WO2020/152525
PCT Pub. Date: Jul. 30, 2020

(65) Prior Publication Data
US 2022/0134261 A1    May 5, 2022

(30) Foreign Application Priority Data

Jan. 21, 2019    (ZA) .................................. 2019/00396

(51) Int. Cl.
*B01D 25/02*    (2006.01)

(52) U.S. Cl.
CPC ........ *B01D 25/02* (2013.01); *B01D 2201/301* (2013.01); *B01D 2201/4038* (2013.01); *B01D 2201/4053* (2013.01)

(58) Field of Classification Search
CPC .............. B01D 25/02; B01D 2201/301; B01D 2201/4038; B01D 2201/4053;
(Continued)

(56) References Cited

U.S. PATENT DOCUMENTS

| 4,430,218 A | 2/1984 | Perl et al. |
| 5,863,424 A | 1/1999 | Lee |

(Continued)

FOREIGN PATENT DOCUMENTS

| DE | 4128747 A1 | 3/1993 |
| DE | 102007028814 A1 | 2/2008 |
| WO | 2010127818 A1 | 11/2010 |

OTHER PUBLICATIONS

International Search Report issued in International Application No. PCT/IB2019/060509 dated Feb. 6, 2020 (4 pages).

(Continued)

*Primary Examiner* — Madeline Gonzalez
(74) *Attorney, Agent, or Firm* — Osha Bergman Watanabe & Burton LLP

(57) ABSTRACT

A modular filter element frame (10) and a filter element frame assembly (100, 150) are disclosed. The filter element frame (10) has an elongate body (12) with a central bore (14) extending axially through the body. In cross-section the body has at least three smooth-ended lobes (16) that extend radially therefrom. The lobes are angularly spaced about the central bore such that a longitudinally extending channel (18) is formed along the body between adjacent lobes. Each channel has a plurality of longitudinally spaced apertures (20) extending into the central bore. Axially outer ends (24, 28) of the body are adapted to enable axial stacking thereof with like modular filter element frames to cooperatively form a filter element frame assembly (100, 150) with a required axial length. The assembly may receive a filter sleeve such that the sleeve extends at least partially along an outer periphery thereof.

16 Claims, 10 Drawing Sheets

(58) Field of Classification Search
CPC .... B01D 2201/0415; B01D 2201/0446; B01D 29/52; B01D 29/15
USPC ....... 210/230, 231, 232, 252, 253, 330, 437, 210/443, 444, 446, 448, 455, 457, 488, 210/495, 108, 275, 333.01, 411, 425, 427
See application file for complete search history.

(56) References Cited

U.S. PATENT DOCUMENTS

| | | | |
|---|---|---|---|
| 2005/0155924 A1* | 7/2005 | Schewitz | B01D 29/15 |
| | | | 210/483 |
| 2010/0000922 A1* | 1/2010 | Crawford | B01D 35/31 |
| | | | 210/167.02 |
| 2013/0140223 A1* | 6/2013 | Gohl | B01D 46/528 |
| | | | 210/198.1 |
| 2017/0197181 A1 | 7/2017 | Benton et al. | |

OTHER PUBLICATIONS

Written Opinion issued in International Application No. PCT/IB2019/060509 dated Feb. 6, 2020 (4 pages).

\* cited by examiner

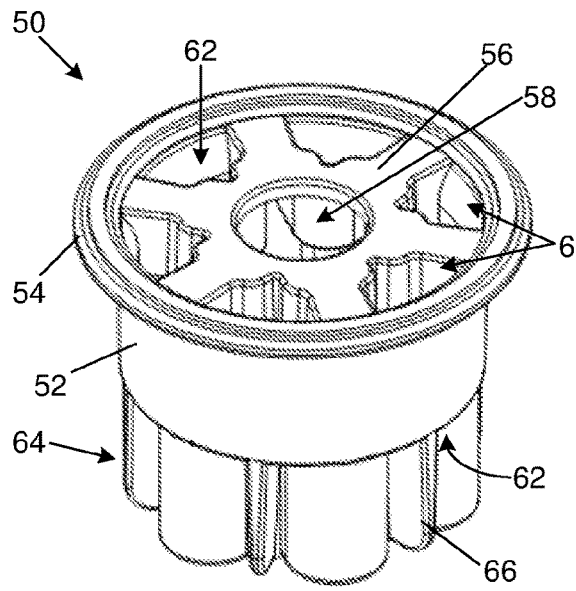
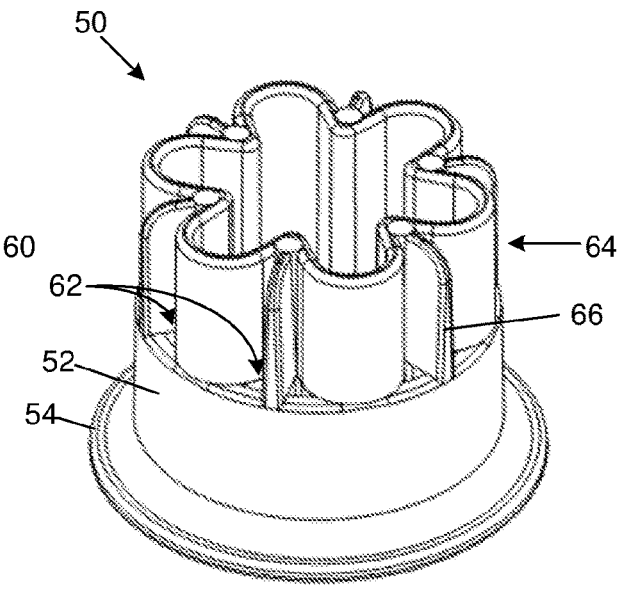
Figure 8
Figure 9
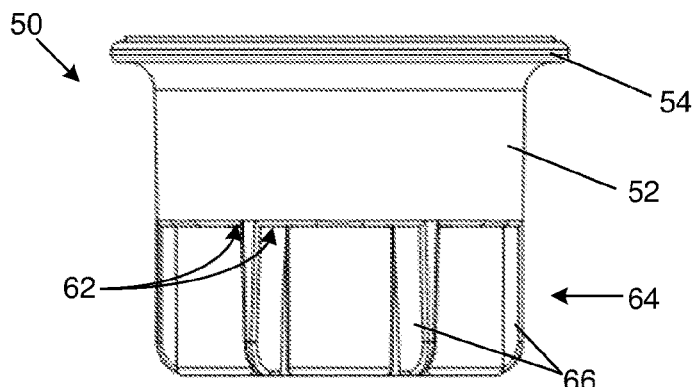
Figure 10
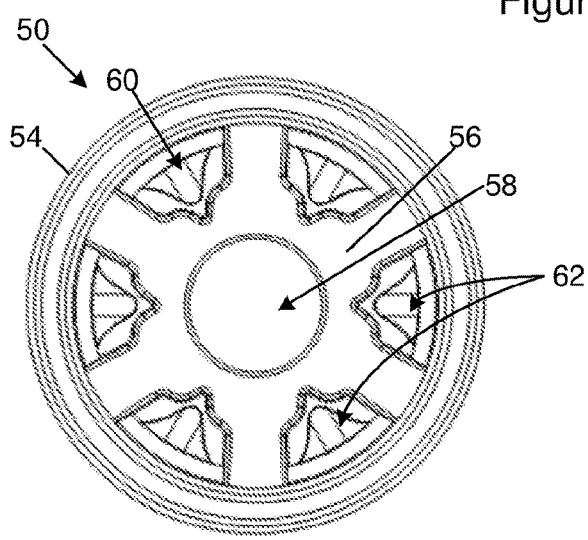
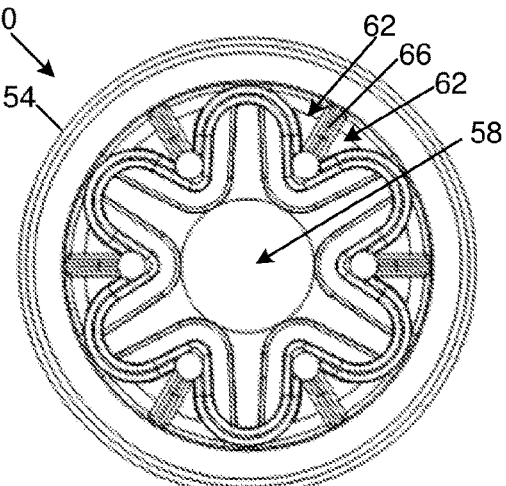
Figure 11
Figure 12

MODULAR FILTER ELEMENT FRAME

CROSS-REFERENCE TO RELATED APPLICATIONS

This application claims priority from South African patent application number 2019/00396 filed on 21 Jan. 2019, which is incorporated by reference herein.

FIELD OF THE INVENTION

The invention disclosed herein relates to filter elements. More particularly, it relates to filter elements used in filters for filtering impurities out of liquids such as water.

It finds particular application, although not exclusively, with a filter element for a liquid filter of the type employing a filter medium, such as a fabric bag or sleeve or other porous panel or wall through which liquid is to pass upon filtration, and wherein a filtration aid such as diatomaceous earth is used in combination with the filter medium to form a layer on the outside of the filter medium. Dirt then becomes deposited on the layer of filtration aid rather than directly on the filter medium.

BACKGROUND TO THE INVENTION

Certain types of filters use a porous substance, such as diatomaceous earth, perlite, cellulose and the like, as a pre-coat material or filter aid to improve the performance and increase the lifespan of filter elements. As part of an initial pre-coating procedure the filtration media of the filter elements, such as filter cloth or a filter sleeve, are coated with the filter aid to form a filter cake thereon with a very small pore size. The filtered substance, usually water, passes through this filter cake before passing through further filter media of the filter elements (such as the filter sleeve).

This provides a number of advantages to the filtration process. For example, it may provide for improved clarity of the filtrate due to the additional filter layer provided by the filter aid. However, it may also extend the life of the filter elements. This is, inter alia, due to the fact that in the absence of filter aid the impurities that are removed may bind directly to the filter media (e.g. filter cloth or a filter sleeve). This can "blind" or damage the filter media and require premature cleaning or replacement thereof, or an increased backwash cycle frequency.

Pre-coat filters generally operate on the principle that when the filter is turned off, the filter aid and dirt collected thereby fall to the bottom of the filter container. When the filter is started up again, inlet fluid serves to stir up the filter aid, usually together with at least some dirt from the bottom of the filter container. By doing so, the filter aid becomes coated onto the filter media of the filter elements once more in preparation for a filter cycle.

The applicant's own granted U.S. Pat. No. 7,520,392 discloses a liquid filter element frame with an elongate injection moulded body having a plurality of support ribs radiating from a central axis thereof. Spaced longitudinally along the elongate body of the filter frame are support rings that each encircle the radially outer edges of the ribs. An operatively lower end of the frame terminates in such a ring. A sleeve made of filter fabric and adapted to be used as a cover for the filter element frame fits over the filter element frame in use.

The applicant believes there to be room for improvement over these filter elements.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with this invention there is provided a modular filter element frame with an elongate body defining a central bore extending axially through the body, the body in cross-section having at least three smooth-ended lobes extending radially therefrom that are angularly spaced about the central bore such that a longitudinally extending channel is formed along the body between adjacent lobes, each channel having a plurality of longitudinally spaced apertures extending into the central bore, one or both of the axially outer ends of the body further being adapted to enable axial stacking thereof with like modular filter element frames so as to cooperatively form a filter element frame assembly with a required axial length with the assembly being arranged to receive a filter sleeve such that the sleeve extends at least partially along an outer periphery of the assembly.

One axially outer end of the modular filter element frame may be adapted to receive a complementary formed filter base configured to at least partially close the central bore at the relevant axial end. An opposite axial end of the filter element frame may be adapted to fit a complementary formed filter cap, the cap being adapted to secure the filter element frame assembly in a filter body.

The body may have a plurality of axially spaced apart rib formations having a shape corresponding to the cross-sectional shape of the body. The apertures along each channel may be provided in an axial space between adjacent rib formations. The apertures may be substantially rectangular in shape.

The one axial end of the body may have axially extending male protrusions arranged to fit complementary formed female indentations in a friction fit. The other axial end of the body may have female indentations extending axially into the body that are arranged to fit the complementary male protrusions in a friction fit, such that like filter element frames are mated to form a filter element frame assembly of required length.

The body may have six smooth-ended lobes. The body may be between 100 mm and 200 mm in length, preferably between 135 mm and 155 mm. The rib formations may be spaced between 10 mm and 20 mm along the body. The central bore may be between 20 mm to 30 mm in diameter.

The filter element frame may be manufactured from a thermoplastics material. The thermoplastics material may be acrylonitrile butadiene styrene (ABS). The filter element frame may be manufactured with an injection moulding process.

In a further aspect of the invention there is provided a filter element frame assembly including:
one or more modular filter element frames, each filter element frame having an elongate body defining a central bore extending axially through the body, the body in cross-section having at least three smooth-ended lobes extending radially therefrom that are angularly spaced about the central bore such that a longitudinally extending channel is formed along the body between adjacent lobes, each channel having a plurality of longitudinally spaced apertures extending into the central bore, one or both of the axially outer ends of the body further being adapted to enable axial stacking thereof with like modular filter element frames so as to cooperatively form an assembly with a required axial length;

a filter base at one axial end of the assembly configured to at least partially close the central bore at the relevant axial end; and a filter cap at an opposite axial end of the assembly, the cap being adapted to secure the assembly in a filter body, the assembly being arranged to receive a filter sleeve such that the sleeve extends at least partially along an outer periphery of the assembly.

An embodiment of the invention will now be described, by way of example only, with reference to the accompanying drawings.

BRIEF DESCRIPTION OF THE DRAWINGS

In the drawings:

FIG. 8 is a three-dimensional view of a filter cap configured to fit the modular filter frame element of FIG. 1 from a first axial end;

FIG. 9 is a three-dimensional view of the filter cap of FIG. 8 from a second axial end;

FIG. 10 is a side view of the filter cap of FIG. 8;

FIG. 11 is a plan view of the filter cap of FIG. 8 from a first axial end;

FIG. 12 is a plan view of the filter cap of FIG. 8 from a second axial end;

DETAILED DESCRIPTION WITH REFERENCE TO THE DRAWINGS

Figure 1:
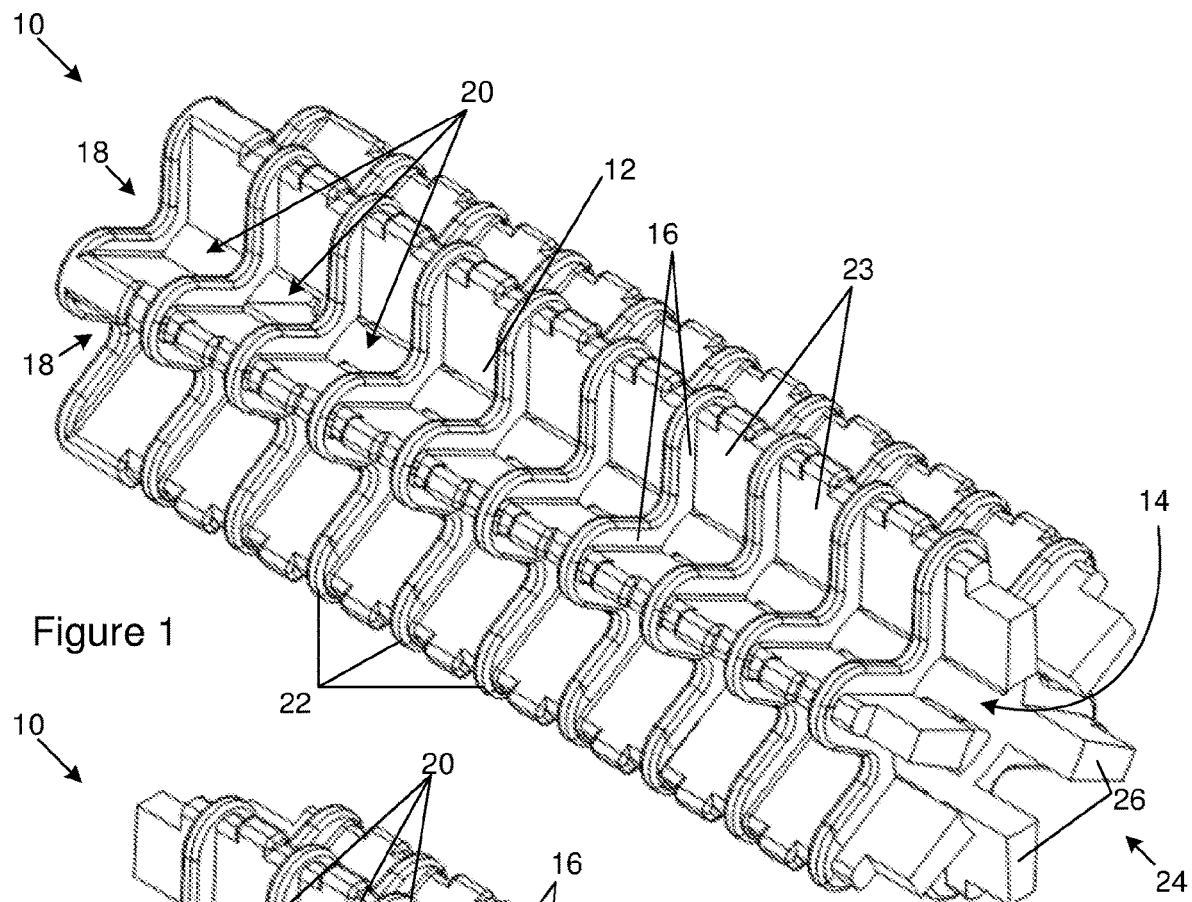
FIG. 1 is a three-dimensional view of a modular filter element frame seen from a first axial end.

Embodiments of a modular filter element frame and filter element frame assembly are described below. The filter element frame has an elongate body and a central bore extends axially through the body. During the normal filter cycle of a filter in which the filter element frame is used, filtered liquid may pass through the central bore. The body has, in cross-section, at least three smooth-ended lobes extending radially therefrom that are angularly spaced about the central bore. A longitudinally extending channel is formed along the body between adjacent lobes with each channel having a plurality of longitudinally spaced apertures extending into the central bore. During the normal filter operation as aforementioned, filtered liquid may pass from outside the body, through the apertures, and into the central bore.

One or both of the axially outer ends of the body are adapted to enable axial stacking thereof with like modular filter element frames. Stacking the modular filter element frames refer to any method of assembling them end-to-end so as to form an elongate filter frame assembly of a required length. Stacking may be achieved through various means, such as a friction or interference fit between adjacent modular filter element frames, by means of screw thread or a similar mating mechanism, or a locking mechanism that is configured to secure the adjacent filter elements end-to-end.

Although the filter element is adapted to enable stacking, in certain applications (e.g. in small filters) the length of a single filter element frame may be sufficient. The number of filter elements required to form a filter frame assembly of sufficient length may depend on operational requirements, filter dimensions, and the like.

Different embodiments having different lengths of modular filter element frames may also be provided to enable the assembly of a filter frame assembly having particular desired total length. Similarly, the width of the modular filter frame may vary between different embodiments as may be dictated by operational requirements and filter dimensions.

In some embodiments, a particular modular filter element frame may be intended to be used as an end-piece. For example, the particular embodiment of the modular filter element frame may have an integrally formed base with only one axial end being adapted to be stacked with another modular filter element frame. Similarly, a further particular embodiment of the modular filter element frame may have an integrally formed cap, with only one axial end being adapted to be stacked with another modular filter element frame.

The body of the modular filter frame element is shaped and formed to receive a filter sleeve thereon, at least partially. The lobes may enable the filter sleeve to fit about the filter frame assembly with a sufficiently tight fit, whilst preventing the sleeve from blocking the apertures. Furthermore, the smooth radially outer ends of the lobes may prevent snagging on the filter sleeve.

One axially outer end of the modular filter element frame may be adapted to receive a complementary formed filter base. The base may at least partially close the central bore at an outermost end of the filter frame assembly. This may be required to maintain a desired flow, since having an aperture as large as the central bore at the outer end of assembly may provide the filtered liquid with an undesirable path of least resistance, which may impede the filtering process.

An opposite axial end of the filter element frame may be adapted to fit a complementary formed filter cap, which may facilitate the securing of the filter frame assembly in the body of a filter in which it is to be used.

The body may furthermore have a plurality of axially spaced apart rib formations having a shape corresponding to the cross-sectional shape of the body. The apertures along each channel may be provided in an axial space between adjacent rib formations. The rib formations may aid in keeping the filter sleeve at a required distance from the apertures in use, and may also provide the filter sleeve with mechanical support. The apertures may be substantially rectangular in shape, however it is envisaged that the apertures may have different shapes in different embodiments.

FIGS. 1 to 7 show an embodiment of a modular filter element frame (10). The filter element frame (10) has an elongate body (12) with a circularly shaped central bore (14) extending axially through the body. In the present embodiment, the body (12) is between 135 mm and 155 mm in overall length, while the central bore is about 25 mm in diameter. However, the particular length of the body (12) and diameter of the central bore (14) may vary depending on the intended application of the particular filter element frame.

Figure 2:
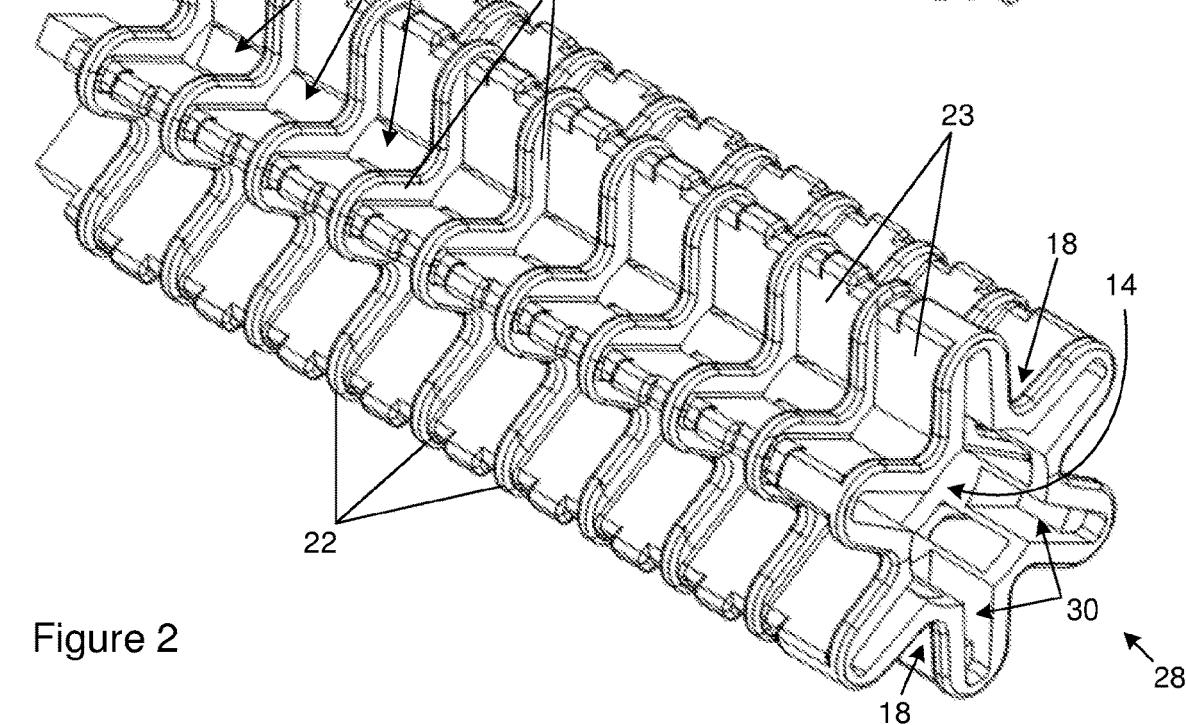
FIG. 2 is a three-dimensional view of the modular filter element frame of FIG. 1 seen from a second axial end.
Figure 3:
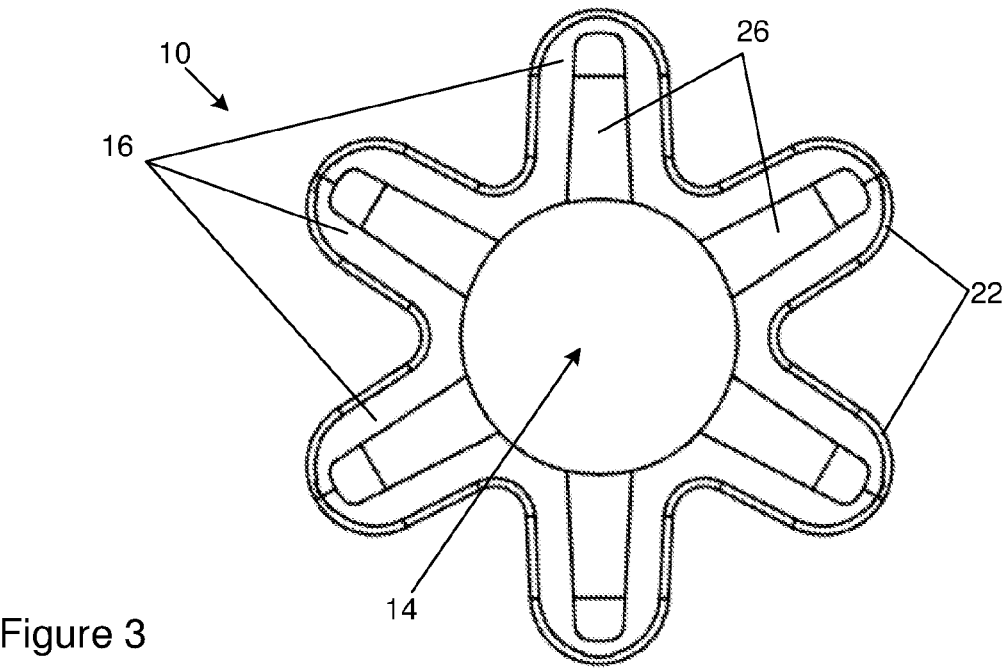
FIG. 3 is a plan view of the modular filter element frame of FIG. 1 as seen from a first axial end.
Figure 4:
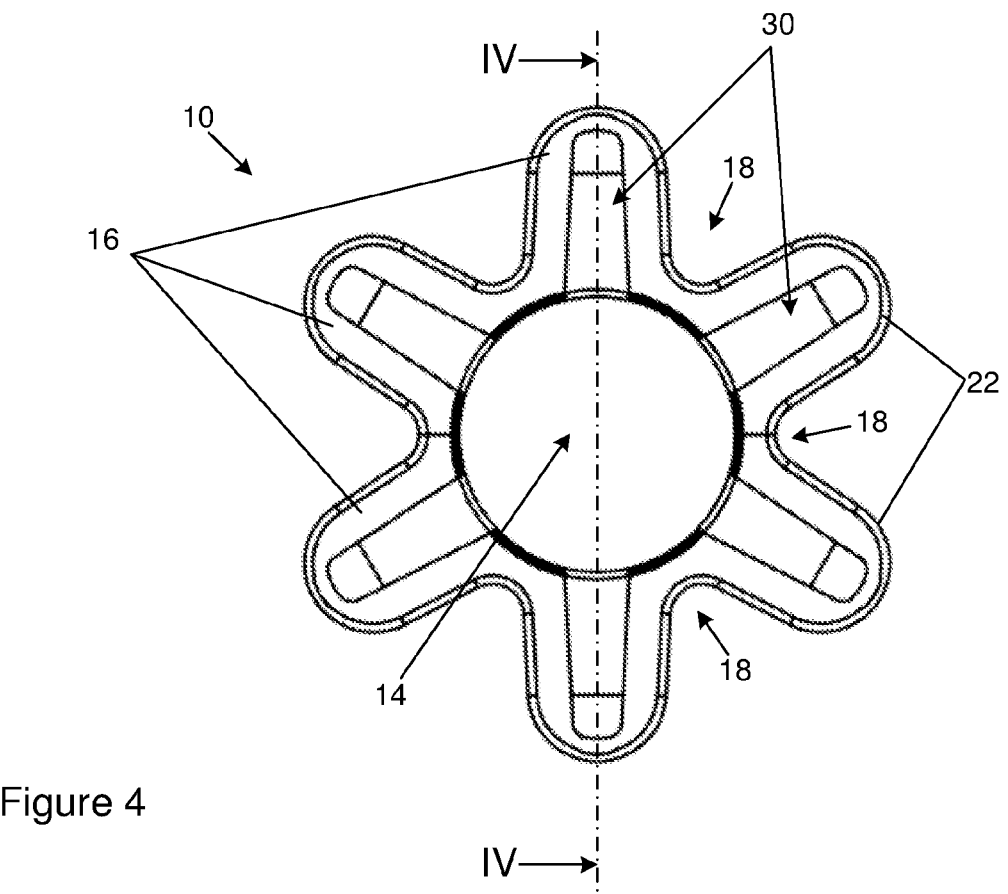
FIG. 4 is a plan view of the modular filter element frame of FIG. 1 as seen from a second axial end.

As shown in FIG. 2, and even more clearly in FIGS. 3 and 4, a cross-section of the body (12) in the present embodiment has six smooth-ended lobes (16) extending radially from the body that are angularly spaced at equal angular intervals about the central bore (14). This cross-sectional shape therefore resembles a round-tipped, six-pointed star. This forms longitudinally extending channels (18) along the body (12) between adjacent lobes (16), and there are therefore six such channels arranged about the body (12). The number and size of the lobes (16) may similarly depend on the intended application of the filter element frame (10).

Each channel (18) has apertures (20) spaced longitudinally along the relevant channel with the apertures (20) extending into the central bore (14). The apertures (20) are substantially rectangular in shape and a major side of the rectangular aperture extends parallel to the longitudinal axis of the body (12). In use, as will be explained below in further detail, the apertures (20) enable filtrate (such as water) to flow through the apertures (20) and into the central bore (14) or vice versa depending on a filter mode and the direction of flow associated with the relevant filter mode.

In the present embodiment, the cross-sectional shape of the body (12) is not uniform along the entire axial length thereof. The body (12) has rib formations (22) that are axially spaced along the body with the shape of the rib formations providing the general cross-sectional shape of the body (12). The rib formations (22) therefore provide the round-tipped, six-pointed star cross-section of the body (12). In the present embodiment, the rib formations are axially spaced at about 15 mm intervals along the body (12). The rectangular apertures (20) are bordered on two of its opposing sides (i.e. the sides extending transverse a longitudinal axis of the body) by the rib formations (22). The remaining two sides of each rectangular aperture (20) are bordered by spokes (23) extending radially from the body (12). The radially outer edges of the spokes (23) have a castellated profile. At the radially outer edges of each of the lobes (16), the rib formations (22) provide smooth-edged arches. These smooth edges may prevent or at least reduce damage to a filter sleeve (not shown) during use or when fitting the filter sleeve over the filter frame when assembled.

The axial ends of the body (12) are adapted to allow the modular filter element frame (10) to be axially stacked to like frames (10) to form an assembly of required axial length. At one axial end (24) of the body (12) six axially extending male protrusions (26) are provided. The male protrusions (26) are substantially trapezoidal in cross-sectional shape and are angularly arranged about the central bore (14) so as to correspond to the radial positions of the lobes (16) formed by the rib formations (22).

Figure 5:
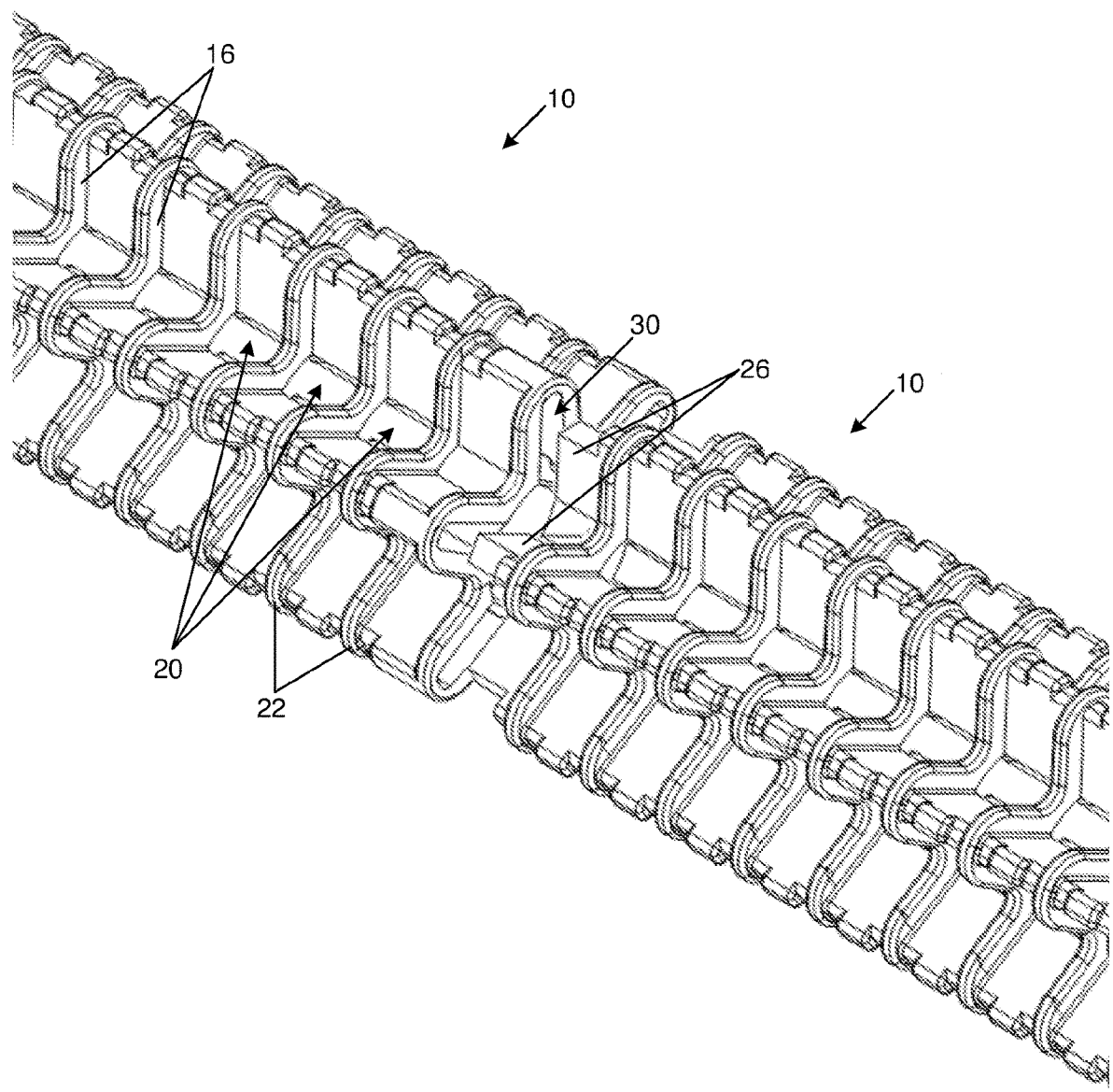
FIG. 5 is a three-dimensional view of two axially aligned modular filter element frames illustrating the manner in which they are to be mated.
Figure 6:
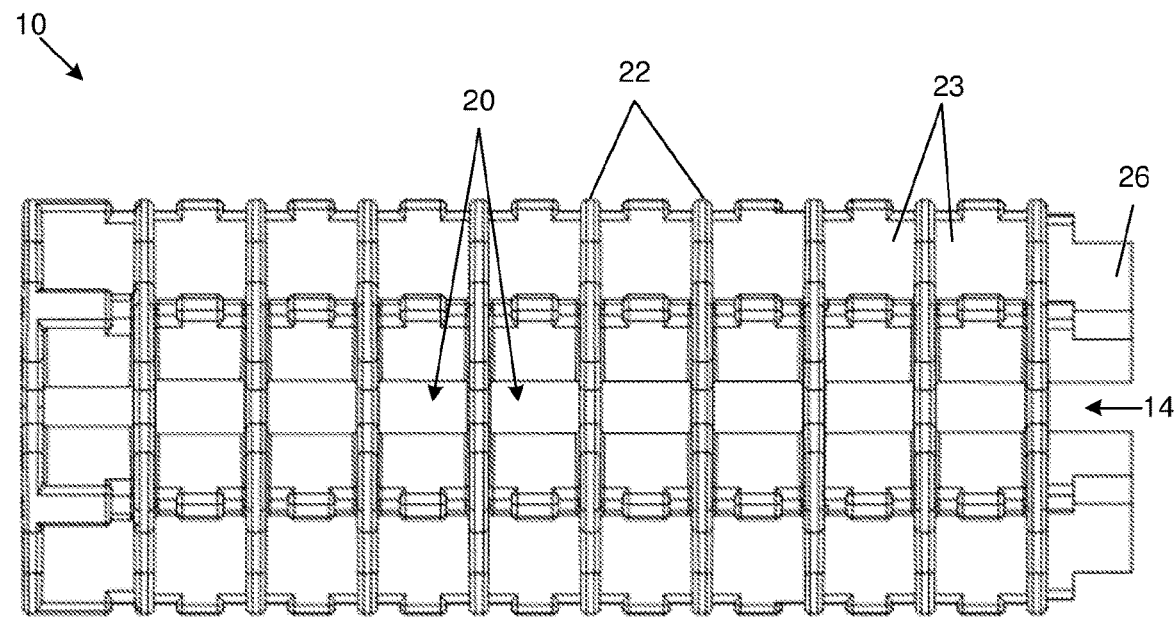
FIG. 6 is a side view of the modular filter frame element of FIG. 1.
Figure 7:
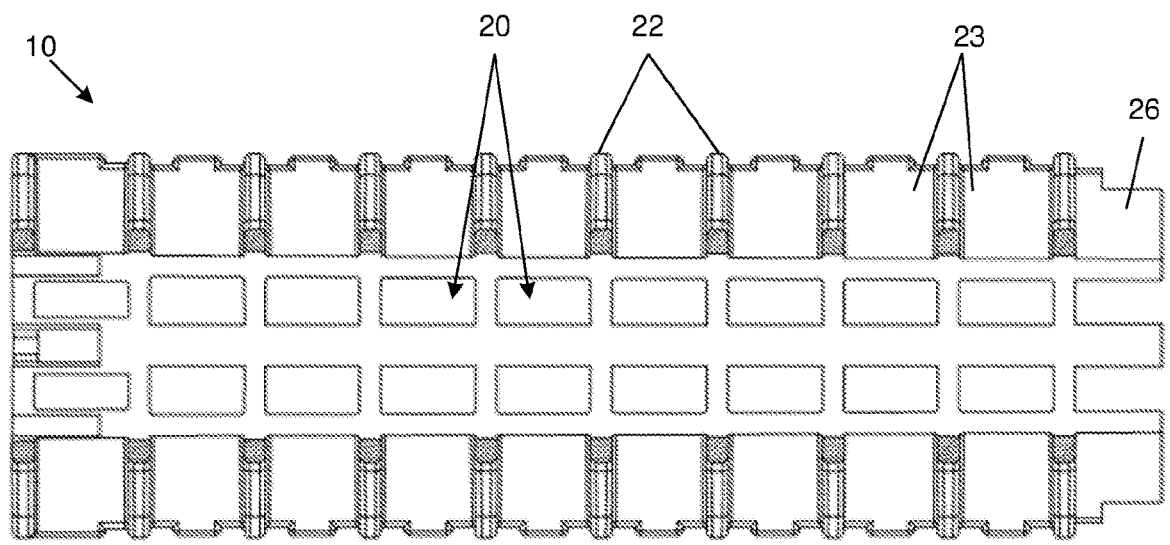
FIG. 7 is a section view of the modular filter frame element of FIG. 1 along the line IV-IV shown in FIG. 4.
Figure 13:
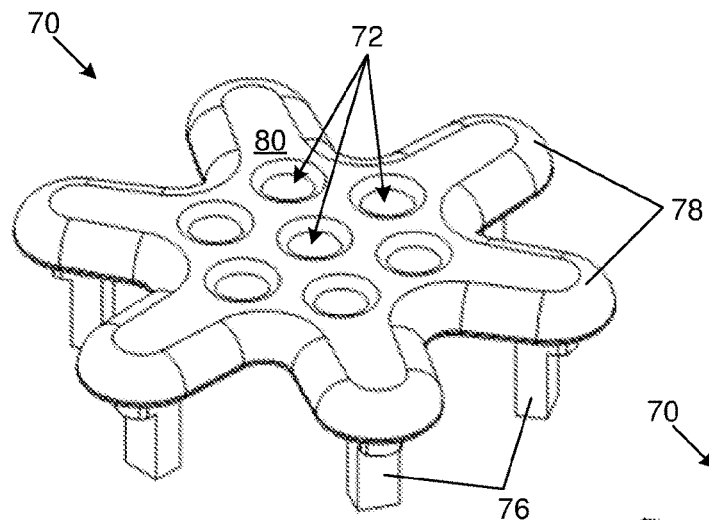
FIG. 13 is a three-dimensional view of a filter base configured to fit the modular filter frame element of FIG. 1 from a first axial end.
Figure 14:
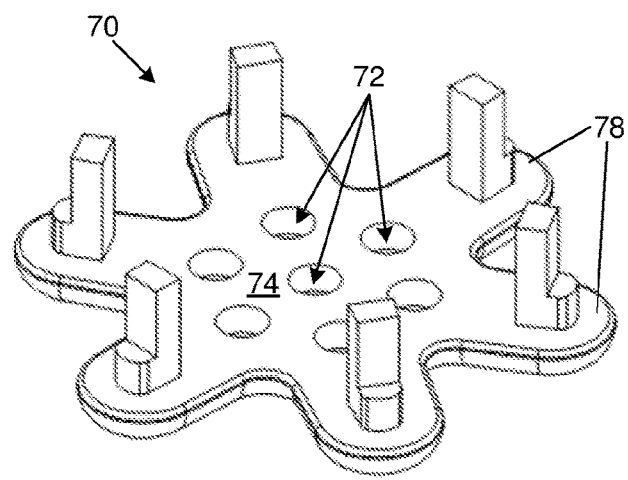
FIG. 14 is a three-dimensional view of the filter base of FIG. 13 from a second axial end.
Figure 15:
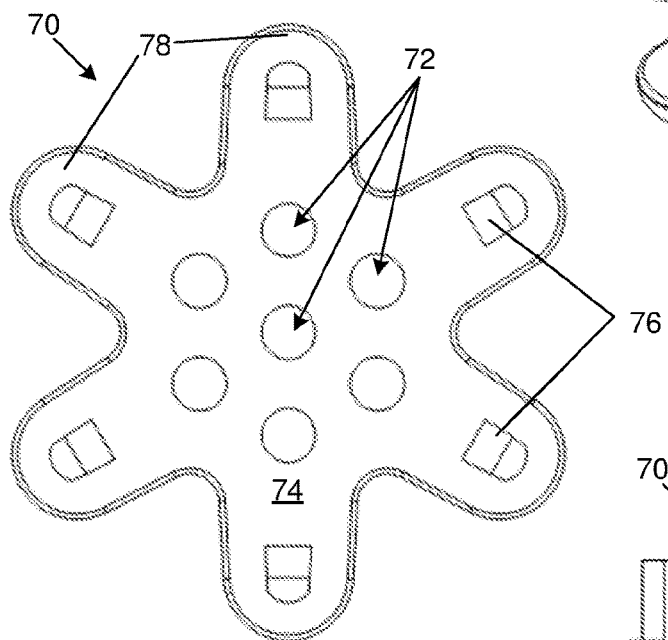
FIG. 15 is a plan view of the filter base of FIG. 13.
Figure 16:
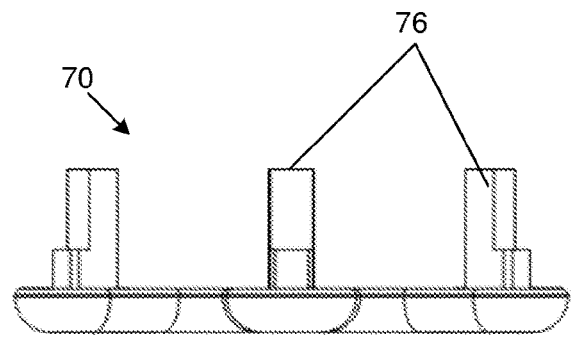
FIG. 16 is a side view of the filter base of FIG. 13.

At an opposite axial end (28) of the body (12), six female indentations (30) are provided that extend axially into the body and are complementary shaped to enable receiving of the male protrusions (26) to mate two adjacent frames (10) in an axially stacked formation. Any number of frames (10) may be stacked in this manner to form the body of a filter element frame assembly. FIG. 5 shows two adjacent frames (10) axially aligned and with the complementary male (26) and female (30) mating parts also aligned. FIG. 5 shows the two frames (10) at a slight axial distance from each other as in a condition immediately before fitting the two frames (10) together in a mated configuration. The male (26) and female (30) parts form a friction fit, which allows an assembly of frames (10) to be easily and rapidly assembled without requiring any further fastening components.

The modular filter element frame (10) is further arranged to enable one axial end (24) thereof to fit a complementary formed filter cap. FIGS. 8 to 12 show an embodiment of such a filter cap (50). A body (52) of the filter cap (50) has a circular cross-sectional shape and has an outer diameter allowing the filter cap to fit into a complementary formed aperture in a filter. At a first axial end of the filter cap (50) a rim (54) is provided with a greater diameter than the cap body (52), which allows the filter cap (50) to be seated in such a filter as discussed in more detail below. Centrally at this first axial end of the filter cap (50) a six-spoked hub (56) is provided with a central aperture (58) with a diameter corresponding to that of the central bore (14) of the frame (10). Peak-shaped apertures (60) are formed between adjacent spokes of the hub (56) that form channels (62) that extend along the circular body (52) of the filter cap (50).

An opposite axial end of the filter cap (50) is a frame receiving end (64) and is adapted to receive an axial end (24) of the modular filter element frame (10) therein. In the present embodiment, the frame receiving end (64) has a cross-sectional shape corresponding to the round-tipped, six-pointed star cross-sectional shape of the filter element frame (10). The frame receiving end (64) is dimensioned to form a friction fit with an axial end (24) of the filter element frame (10). Radially extending fins (66) extend from the channels formed between adjacent lobes of the frame receiving end (64). The fins (66) divide the openings of the respective channels (62) where they exit the circular body (52) of the filter cap (50) as is seen more clearly on FIG. 12.

The modular filter element frame (10) is furthermore arranged to enable an opposite axial end (28) thereof to receive a filter base, i.e. the axial end opposite the end (24) arranged to fit a filter cap (50). FIGS. 13 to 16 show an embodiment of such a filter base (70). The filter base (70) is substantially planar with a shape in plan view corresponding to the cross-sectional shape of the modular filter element frame (10). The shape of the filter base (70) therefore also resembles a round-tipped six-pointed star as is shown more clearly in FIG. 15. Seven centrally positioned apertures (72) extend through the base (70).

A first side (74) of the base is arranged to fit into the filter element frame (10) in use and has six male protrusions (76), similar to the male protrusions (26) of the filter element frame (10), extending substantially perpendicularly away from the first side (74). The male protrusions (76) are positioned near the outer ends of the lobes (78) of the base (70) and the positions thereof align with the female indentations (30) provided in the filter element frame (10). This allows the filter base (70) to be mated with one axial end (28) of the filter element frame (10). When mated to a filter element frame (10), the filter base (70) partially encloses the central bore (14) of the frame (10) with the seven apertures (72) being positioned immediately opposite the central bore (14). A second side (80) of the filter base (70) faces away from the filter element frame (10) when mated therewith. The second side (80) has rounded edges which may prevent a filter sleeve (not shown) from snagging thereon or chafing against a sharp edge, which could cause unnecessary wear to the filter sleeve.

Figure 17:
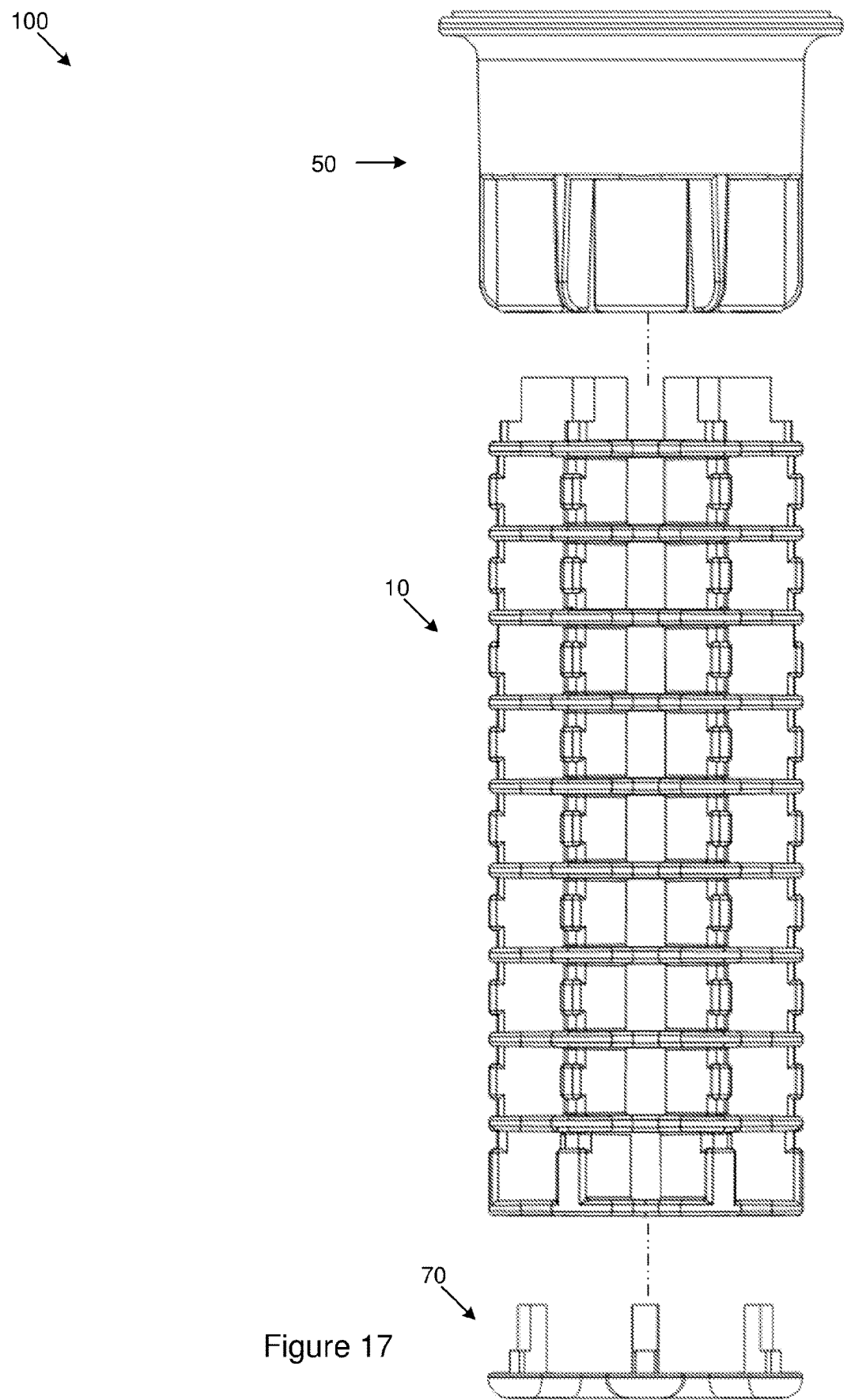
FIG. 17 is an exploded view of a filter element frame assembly including one modular filter element frame, a filter cap, and a filter base.

FIG. 17 shows an exploded view of an assembly (100) comprising one modular filter element frame (10), a filter cap (50) at a first axial end of the frame and a filter base (70) at an opposite axial end of the frame. As shown in FIG. 17, the axial end of the filter element frame (10) that is arranged to fit into the filter cap (50), in the present embodiment, is the axial end (24) having the male protrusions (26). As is also shown in FIG. 17, the axial end of the filter element frame (10) that is arranged to receive the filter base (70) is, in the present embodiment, the axial end (28) having the female indentations (30).

Figure 18:
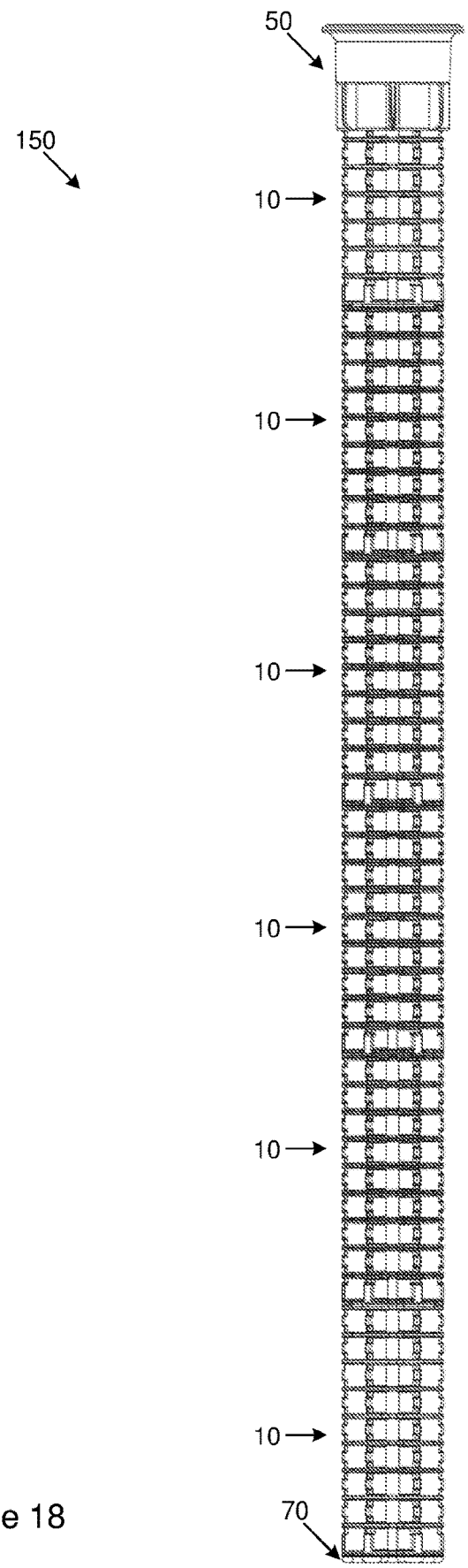
FIG. 18 is a side view of a filter element frame assembly including six modular filter element frames, a filter cap, and a filter base.

However, any number of modular filter element frames (10) may be axially stacked to form a filter element frame assembly of required length. FIG. 18 shows a filter element frame assembly (150) having six modular filter element frames (10) axially stacked with a filter cap (50) provided at one axial end of the assembly and a filter base (70) at an opposite end. Again, the number of filter element frames (10) used in this assembly (150) is for illustration purposes only and any number of frames (10) may be stacked depending on the size of the filter in which it is to be used, the filter capacity required, etc.

Figure 19:
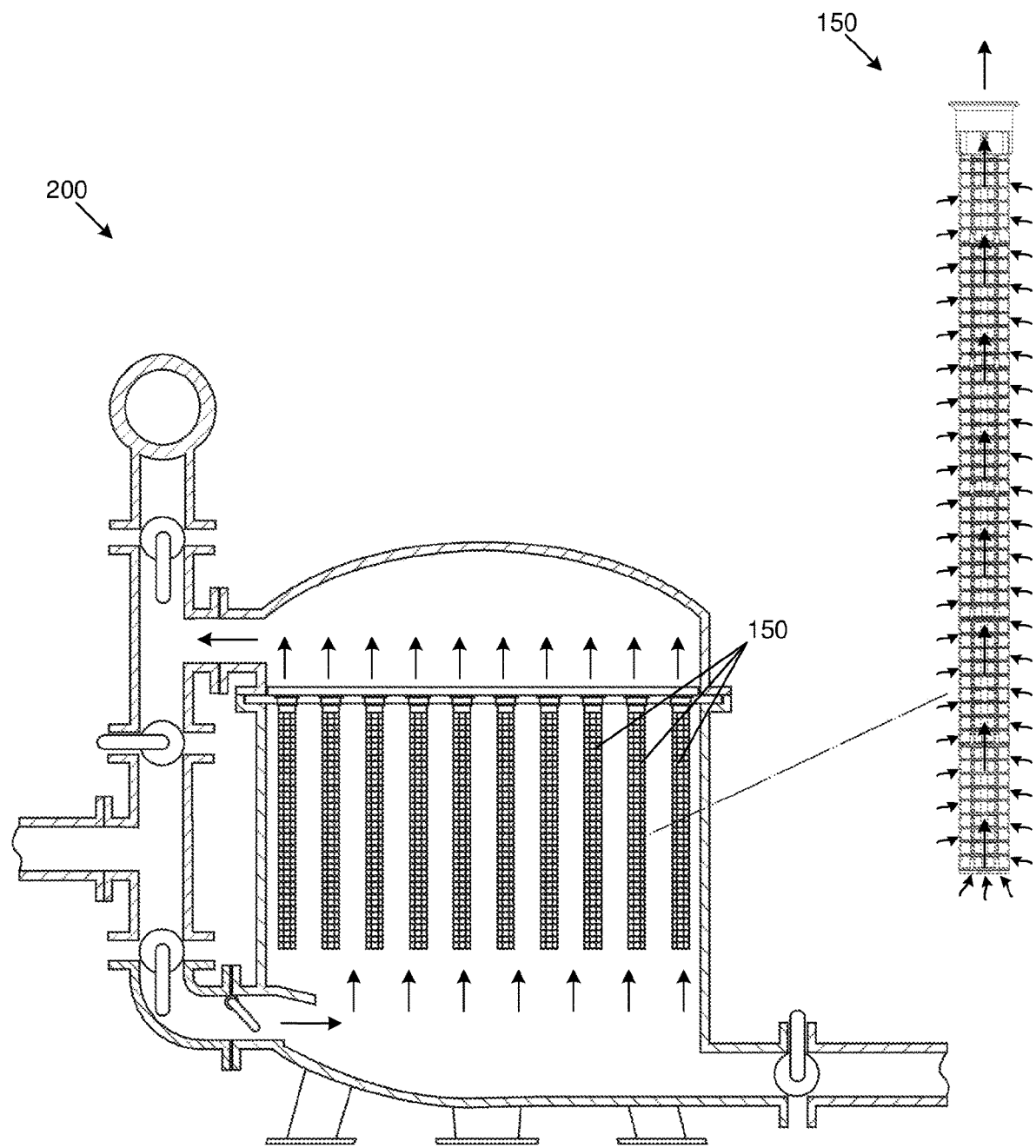
FIG. 19 is a schematic view of a filter having 10 filter element frame assemblies installed therein in a filtration mode.
Figure 20:
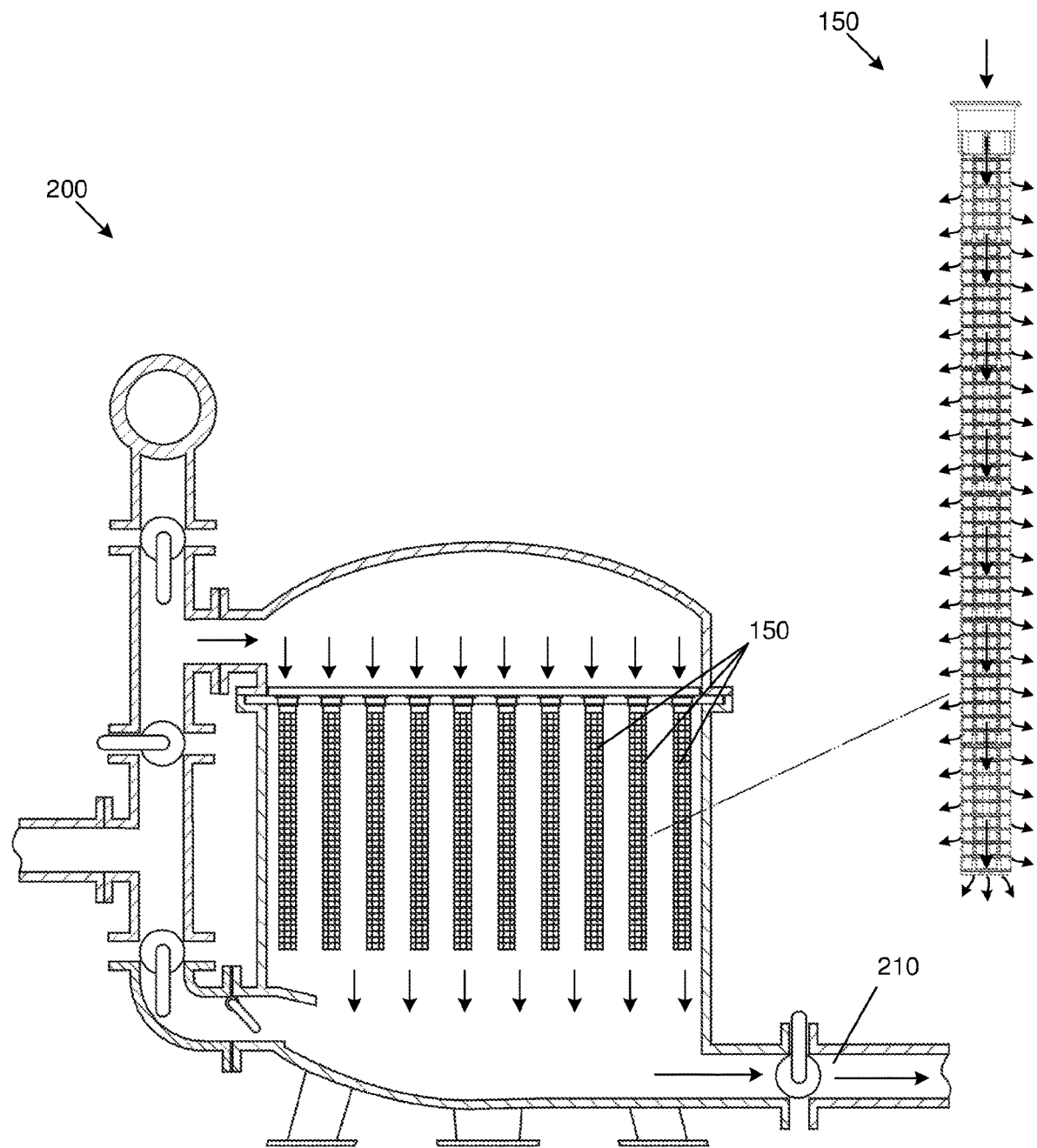
FIG. 20 is a schematic view of the filter of FIG. 19 in a backwash mode.

To facilitate understanding of the operation of the filter element frame and an assembly thereof, the use of such an assembly (150) with a filter (200) is shown in FIGS. 19 and 20.

FIG. 19 shows a filter (200) in a normal filtration mode with a forward flow in which a liquid to be filtered, water in this embodiment, passes from the radially outer edge of a filter element assembly (150), through the apertures (20) provided in the channels (18) along the modular filter element frames (10) and travels operatively upwardly through the central bore (14) extending longitudinally within the filter element frame assembly (150). Some water also enters the central bore through the apertures (72) provided in the filter base (70). The water exits the filter element frame assembly through the central aperture (58) of the filter cap (50). Some water may also flow through the channels (62) extending within the filter cap (50) and exits the filter cap through the peak-shaped apertures (60). The flow of water in this filtration mode is illustrated by the arrows shown with the enlargement of a filter element frame assembly (150) on the right hand side of FIG. 19.

In use, each of the filter element frame assemblies (150) will have a filter sleeve or filter sock extending along the outer peripheries thereof. Filter aid (not shown) such as diatomaceous earth will form a filter cake on the outside of the filter sleeve forming a first filter stage before the water passes through the filter sleeve and through the filter element frame assembly.

The smooth edges provided by the rib formations (22) on the modular filter element frames (10), coupled with the spacing thereof, may provide the filter sleeve with support along the length of the entire filter element frame assembly (150) whilst subjecting the filter sleeve to minimal chafing. The generous provision of apertures (20) along the channels (18) of the filter element frame (10), coupled with the generously sized central bore (14) may furthermore provide superior flow rates through the filter elements.

FIG. 20 shows the filter (200) in a backwash mode in which the flow of water is substantially the reverse of the flow during filtration mode shown in FIG. 19. However, during backwash the water is water is purged through an outlet (210) and may include filter aid (such as diatomaceous earth) and dirt previously filtered from the water by the filter elements. The flow of water through the filter element frame assemblies is shown in FIG. 20 by the arrows and, more particularly, in the enlargement shown on the right-hand side of FIG. 20.

The modular filter element frame disclosed herein therefore enables the assembly of a filter element frame assembly of a substantially arbitrary length by enabling the axial stacking of such frames. Forming such an assembly is further simplified by providing friction fit mating means between axially stacked filter element frames, thereby requiring no further hardware to secure adjacent frames to each other. Similarly, no additional hardware is required to secure the stacked frames to a filter cap and a filter base.

The generous provision of apertures may provide superior flow rates into the filter element assembly, and the generously sized central bore may further aid flow rates through the assembly.

The lifespan of a filter sleeve may furthermore be prolonged by the mechanical support provided by the filter element frames through the provision of closely spaced rib formations with smooth edges.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A filter element frame comprising:
    an elongate body having a central tube forming a cylindrical bore extending axially through the elongate body,
    the elongate body in a cross-section having at least three smooth-ended lobes extending radially outwards from the central tube and that are angularly spaced about the central tube such that a longitudinally extending channel is formed along the elongate body between adjacent smooth-ended lobes, and
    a plurality of longitudinally spaced apertures in the central tube that open into each longitudinally extending channel,
    wherein the elongate body has a first axial end with male protrusions extending axially from the elongate body and has a second, opposite axial end with complementary female indentations extending axially into the elongate body, so that the filter element frame can be mated to other filter element frames in a friction fit to form a filter element frame assembly of a selected length,
    and wherein the filter element frame is arranged to receive a filter sleeve such that the filter sleeve extends at least partially along an outer periphery of the filter element frame and the smooth-ended lobes support the filter sleeve away from the central tube to prevent the filter sleeve from blocking the longitudinally spaced apertures in the central tube.

2. The filter element frame as claimed in claim 1, wherein the elongate body has two axial ends, and wherein one axial end of the filter element frame is adapted to receive a complementary formed filter base configured to at least partially close the central tube at the one axial end.

3. The filter element frame as claimed in claim 2, wherein an opposite axial end of the filter element frame is adapted to fit a complementary formed filter cap, the complementary formed filter cap being adapted to secure the filter element frame in a filter body.

4. The filter element frame as claimed in claim 1, wherein the elongate body has a plurality of axially spaced apart rib formations having a shape corresponding to a cross-sectional shape of the elongate body.

5. The filter element frame as claimed in claim 4, wherein the plurality of longitudinally spaced apertures are provided in an axial space between adjacent rib formations.

6. The filter element frame as claimed in claim 4, wherein the plurality of axially spaced apart rib formations are spaced between 10 mm and 20 mm along the elongate body.

7. The filter element frame as claimed in claim 1, wherein the plurality of longitudinally spaced apertures are rectangular in shape.

8. The filter element frame as claimed in claim 1, wherein the elongate body has six smooth-ended lobes.

9. The filter element frame as claimed in claim 1, wherein the elongate body is between 100 mm and 200 mm in length.

10. The filter element frame as claimed in claim 9, wherein the elongate body is between 135 mm and 155 mm in length.

11. The filter element frame as claimed in claim 1, wherein the central tube has a diameter of between 20 mm and 30 mm.

12. The filter element frame as claimed in claim 1, wherein the filter element frame is manufactured from a thermoplastics material.

13. The filter element frame as claimed in claim 12, wherein the thermoplastics material is acrylonitrile butadiene styrene (ABS).

14. The filter element frame as claimed in claim 12, wherein the filter element frame is manufactured by means of an injection molding process.

15. The filter element frame as claimed in claim 1, wherein the at least three smooth-ended lobes extend radially outwards from the central tube by a distance of at least half a diameter of the central tube.

16. A filter element frame assembly comprising:
one or more filter element frames, each filter element frame having an elongate body having a central tube forming a cylindrical bore extending axially through the elongate body, the elongate body in a cross-section having at least three smooth-ended lobes extending radially outwards from the central tube and that are angularly spaced about the central tube such that a longitudinally extending channel is formed along the elongate body between adjacent smooth-ended lobes, wherein a plurality of longitudinally spaced apertures extend in the central tube and open into each longitudinally extending channel, wherein the elongate body has a first axial end with male protrusions extending axially from the elongate body and has a second, opposite axial end with complementary female indentations extending axially into the elongate body, so that the filter element frame can be mated to other filter element frames in a friction fit to form a filter element frame assembly of a selected length;
a filter base at the second axial end of the filter element frame assembly configured to at least partially close the central tube at the second axial end; and
a filter cap at the first axial end of the filter element frame assembly, the filter cap being adapted to secure the filter element frame assembly in a filter body,
the filter element frame assembly being arranged to receive a filter sleeve such that the filter sleeve extends at least partially along an outer periphery of the filter element frame assembly and the smooth-ended lobes support the filter sleeve away from the central tube to prevent the filter sleeve from blocking the longitudinally spaced apertures in the central tube.

* * * * *